(12) United States Patent
Chang et al.

(10) Patent No.: US 7,834,588 B2
(45) Date of Patent: Nov. 16, 2010

(54) CHARGING DEVICE CAPABLE OF PROVIDING BACKFLOW CURRENT AND INRUSH CURRENT PROTECTION

(75) Inventors: Yu-Wei Chang, Taipei (TW); Kuo-Pao Liao, Taipei (TW)

(73) Assignee: ALI Corporation, Taipei (TW)

( * ) Notice: Subject to any disclaimer, the term of this patent is extended or adjusted under 35 U.S.C. 154(b) by 750 days.

(21) Appl. No.: 11/782,642

(22) Filed: Jul. 25, 2007

(65) Prior Publication Data

US 2008/0297114 A1 Dec. 4, 2008

(30) Foreign Application Priority Data

May 31, 2007 (CN) .................. 2007 1 0108739

(51) Int. Cl.
*H02J 7/00* (2006.01)
*G01N 27/416* (2006.01)
(52) U.S. Cl. ............... 320/134; 320/136; 320/149; 320/155; 324/426

(58) Field of Classification Search .................. 320/134
See application file for complete search history.

(56) References Cited

U.S. PATENT DOCUMENTS

| 6,614,206 | B1 * | 9/2003 | Wong et al. ............... 320/136 |
| 6,958,591 | B1 | 10/2005 | Smith |
| 6,967,468 | B2 * | 11/2005 | Felder ..................... 320/136 |
| 2005/0231168 | A1 * | 10/2005 | Lin ......................... 320/134 |
| 2005/0258805 | A1 * | 11/2005 | Thomas et al. ............ 320/134 |

* cited by examiner

*Primary Examiner*—Edward Tso
*Assistant Examiner*—Yalkew Fantu
(74) *Attorney, Agent, or Firm*—Winston Hsu; Scott Margo

(57) ABSTRACT

A charging device capable of providing backflow current and inrush current protection includes a reception end for receiving a charging voltage, a rechargeable battery, and a dynamic protection unit coupled between the reception end and the rechargeable battery for controlling connection between the reception end and the rechargeable battery according to a control signal and connection condition between the reception end and the charging voltage.

12 Claims, 4 Drawing Sheets

CHARGING DEVICE CAPABLE OF PROVIDING BACKFLOW CURRENT AND INRUSH CURRENT PROTECTION

BACKGROUND OF THE INVENTION

1. Field of the Invention

The present invention related to a charging device capable of providing backflow current and inrush current protection, and more particularly, to a charging device capable of providing backflow current and inrush current protection simultaneously by means of a dynamic protection unit.

2. Description of the Prior Art

With the tide of electronic devices turning towards smaller and lighter devices, portable electronic devices, such as mobile phones, cameras and personal digital assistants (PDAs), are used more and more frequently in daily life. For helping users to carry portable electronic devices at anytime and anywhere, the portable electronic devices are all equipped with rechargeable batteries for providing desired electric power when the portable electronic devices operate. In general, when the electric power of the rechargeable batteries are exhausted, the portable electronic devices can perform recharging procedures for the rechargeable batteries by connecting to an external power source through a connecting line, such as an universal serial bus (USB), so as to maintain effective operation of the portable electronic devices. When the portable electronic device is connected to an external power source, an internal power control circuit of the portable electronic device switches the power source from the rechargeable battery to the external power source. At such a time, the external power source not only supplies sufficient power to the portable electronic device for normal operation, but also enables the recharging procedures for the rechargeable battery to replenish consumed energy of the rechargeable battery until the portable electronic device disconnects from the external power source.

However, the above-mentioned recharging manner often results in the following two issues. First, when the portable electronic device is connected to an external power source for being recharged, at that instant an inrush current occurs that impacts internal circuits of the portable electronic device and the battery before the system is stable, with a result that the circuit components of the portable electronic device are damaged over a long period of time. Second, when the portable electronic device is removed from the external power source after completing recharging the battery, if the power control circuit cannot cut off the current paths immediately, a backflow current then occurs to flow back to the integrated circuits (ICs) of the portable electronic device from the rechargeable battery, resulting in error operations of the portable electronic device.

Thus, in order to solve the problems, U.S. Pat. No. 6,967,468 "Overvoltage and Backflow Current Protection for A Battery Charger" discloses a charging device, which increases a protection device between the current source and the rechargeable battery. When the charging voltage disappears, the protection device immediately cuts off the current path between the battery and the current source, such that the currents cannot flow back to other integrated circuits of the portable electronic device from the rechargeable battery. Please refer to FIG. 1. FIG. 1 is a schematic diagram of a charging device 10 disclosed in U.S. Pat. No. 6,967,468. As shown in FIG. 1, a transistor MP1 is a current source for providing charging currents, and a protection device 11 includes transistor MP2 and MN1 and resistors R1, R2 and R3. In a normal charging mode, the transistor MN1 is turned on for the resistors R1 and R2 capable of providing a bias voltage to the transistor MP2, and the transistor MP2 can further be turned on when the weighting of the resistors R1, R2 and R3 is appropriately adjusted, so that the charging device 10 can charge the rechargeable battery normally. When completing recharging the battery, the voltage of the external power source (+5V) disappears. At this time, the resistor R3 can provide a voltage from the battery for a gate electrode of the transistor MP2, and the transistor MN1 is turned off for blocking the bias voltage from the resistors R1 and R2, such that the transistor MP2 can be turned off immediately. Therefore, the current path between the transistor MP1 and the rechargeable battery is disconnected, so as to achieve the backflow current protection.

In the prior art, since the gate electrode of the transistor MP1 is still in a floating state at the instant when the charging device 10 is connected to the external power source (+5V), a conducting path will be formed in the transistors MP1 and MP2 before the system is stable, so that an uncontrollable inrush current may occur to damage the circuit elements of the portable electronic device. Besides, since the protection device 11 will generate a voltage difference between the transistor MP1 of the current source and the rechargeable battery, for preventing the transistor MP1 from being compressed into the triode region during the recharging process, the source-to-gate voltage Vsg of the transistor MP2 cannot be too great, so that the size of the transistor MP2 has to be increased. On the other hand, when recharging the battery, a leakage current will be generated through the resistors R1 and R2 to the ground. Thus, in order to prevent from too much leakage current, the values of the resistors have to be increased, so as to increase the layout area.

Therefore, the prior art provides the method for preventing from backflow current, but the prior art does not provide the inrush current protection at the same time. Besides, the prior art has to increase the layout area greatly, and thus the production cost is increased as well.

SUMMARY OF THE INVENTION

It is therefore a primary objective of the present invention to provide a charging device capable of providing backflow current and inrush current protection.

The present invention discloses a charging device capable of providing backflow current and inrush current protection. The charging device includes a reception end for receiving a charging voltage; a rechargeable battery; and a dynamic protection unit, coupled between the reception end and the rechargeable battery, for controlling connection between the reception end and the rechargeable battery according to a control signal and a connection condition between the reception end and the charging voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
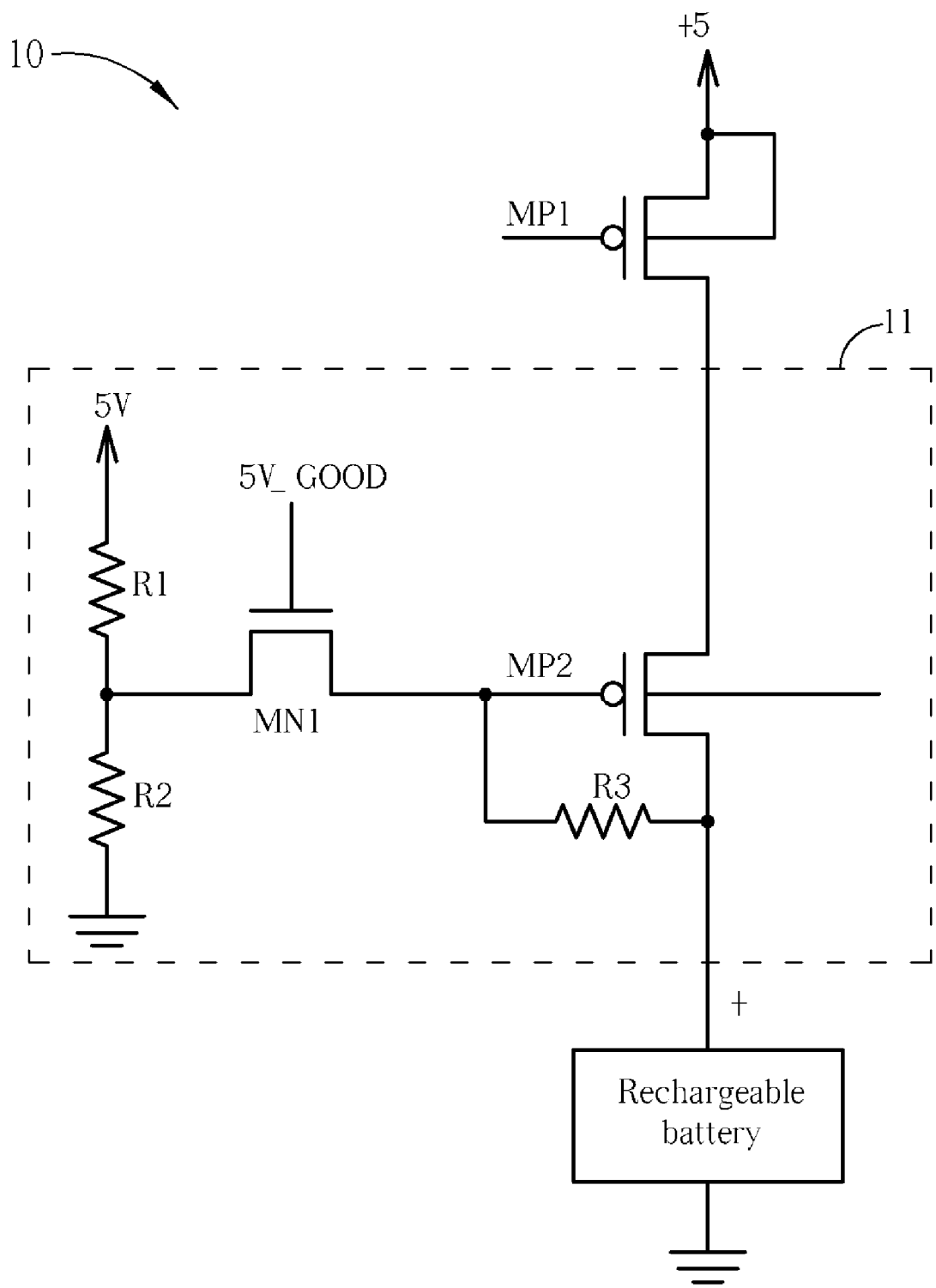
FIG. 1 is a schematic diagram of a charging device disclosed in U.S. Pat. No. 6,967,468.
Figure 2:
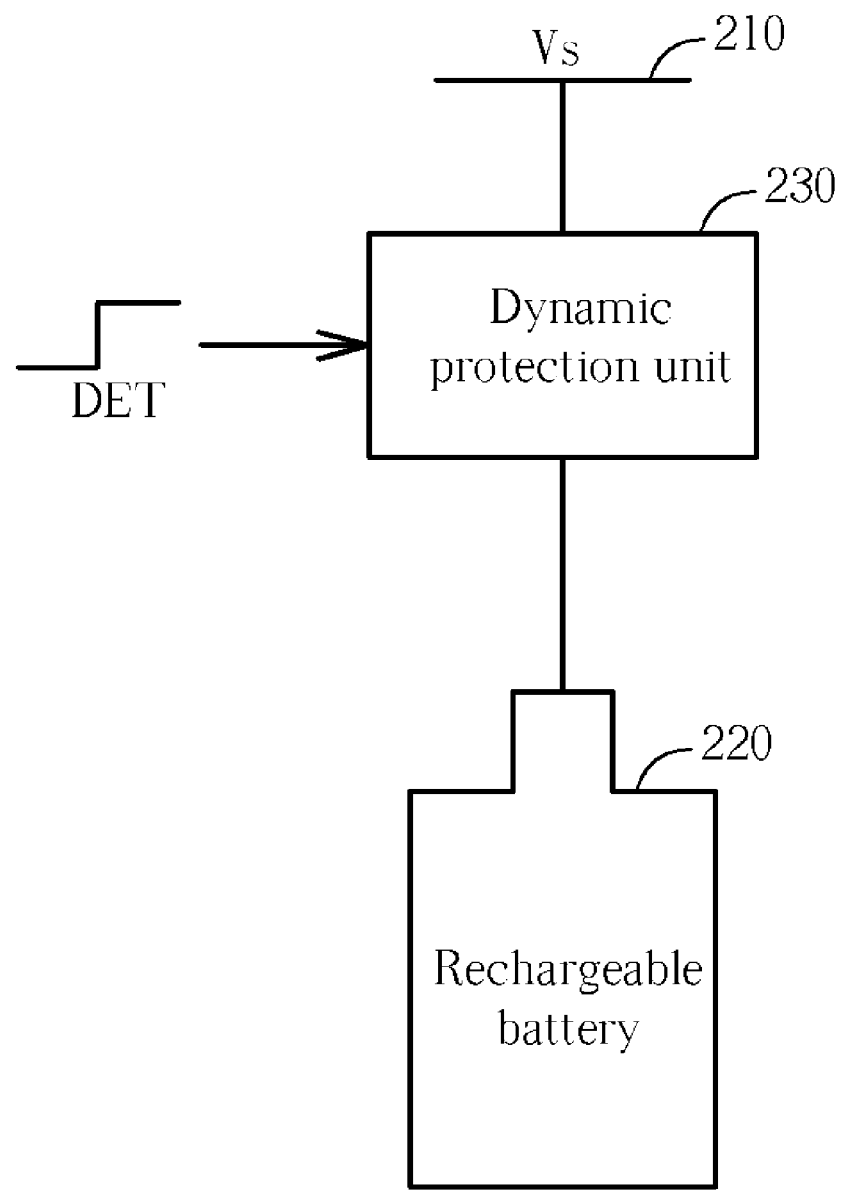
FIG. 2 is a schematic diagram of a charging device of the present invention.

Please refer to FIG. 2. FIG. 2 is a schematic diagram of a charging device 20 of the present invention. The charging device 20 can be utilized in a portable electronic device for providing backflow current and inrush current protection when performing charging procedures, and includes a reception end 210, a rechargeable battery 220 and a dynamic protection unit 230. The reception end 210 is utilized for receiving a charging voltage Vs. The dynamic protection unit 230 is coupled between the reception end 210 and the rechargeable battery 230, and is utilized for controlling connection between the reception end 210 and the rechargeable battery 230 according to a control signal DET and a connection condition between the reception end 210 and the charging voltage Vs. Preferably, the dynamic protection unit 230 can cut off a current path between the reception end 210 and the rechargeable battery 220 according to a first voltage level of the control signal DET and a voltage of the rechargeable battery 220 when the connection between the reception end 210 and the charging voltage Vs is removed, and can conduct the current path between the reception end 210 and the rechargeable battery 220 according to a second voltage level of the control signal DET and the charging voltage Vs when the charging voltage Vs is connected to the reception end 210.

Moreover, the control signal DET can be generated by a control signal output unit (not shown in FIG. 2), which can output the first voltage level of the control signal DET when the charging voltage Vs is removed, and can output the second voltage level of the control signal DET after a predetermined time when the charging voltage Vs is connected (i.e. when the system is stable). In this case, the first voltage level is a low logic voltage level, and the second voltage level is a high logic voltage level. Please note that, the control signal output unit can be implemented in firmware or any hardware, which is not a limitation of the present invention.

Therefore, when the connection between the reception end 210 and the charging voltage Vs is removed, that is, when removing an external power source after completing recharging procedures, the charging device 20 of the present invention can cut off the current path between the reception end 210 and the rechargeable battery 220 for providing backflow current protection according to the first voltage level of the control signal DET and the voltage of the rechargeable battery 220. On the other hand, when the charging voltage Vs is connected to the reception end 210, that is, when the charging device 20 is connected to the external power source, the charging device 20 of the present invention can conduct the current path between the reception end 210 and the rechargeable battery 220 after the system is stable according to the second voltage level of the control signal DET and the charging voltage Vs, so as to achieve the inrush current protection.

Figure 3:
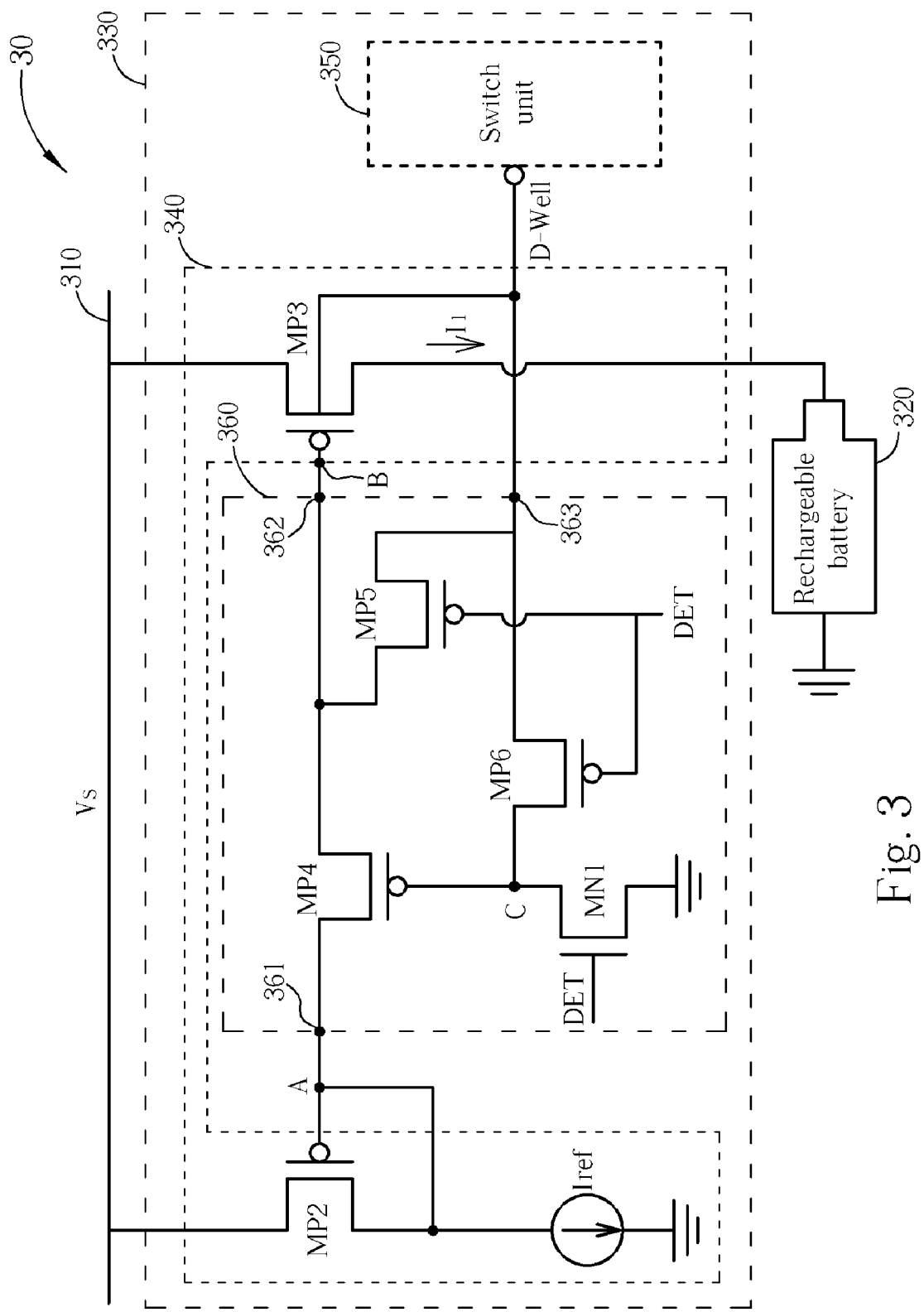
FIG. 3 is a schematic diagram of a charging device according to an embodiment of the present invention.

Please refer to FIG. 3. FIG. 3 is a schematic diagram of a charging device 30 according to an embodiment of the present invention. The charging device 30 is utilized for realizing the charging device 20, and the reception end 310 and the rechargeable battery 320 are similar to that in the charging device 20, which are not described again. Preferably, the charging device 30 can be installed in a portable electronic device, and can be utilized for charging the rechargeable battery 320 through a universal serial bus (USB) of a computer system. The dynamic protection unit 330 includes a current generation unit 340, a switch unit 350 and a control unit 360. The current generation unit 340 is coupled between the reception end 310 and the rechargeable battery 320, and is utilized for generating a charging current I1 and a corresponding current path. The switch unit 350 is utilized for outputting the voltage of the rechargeable battery 320 when the connection between the reception end 310 and the charging voltage Vs is removed, and for outputting the charging voltage Vs when the charging voltage Vs is connected to the reception end 310. The control unit 360 is coupled to bias ends of the current generation unit 340 (i.e. node A and B) through a first end 361 and a second end 362 respectively, and is coupled to the switch unit 350 through a third end 363. The control unit 360 is utilized for controlling connection between the bias ends of the current generation unit 340 (node A and B) according to the voltage level of the control signal DET and the voltage outputted by the switch unit 350. As for the detailed operations of each part of the dynamic protection unit 330, please refer to the following description.

Figure 4:
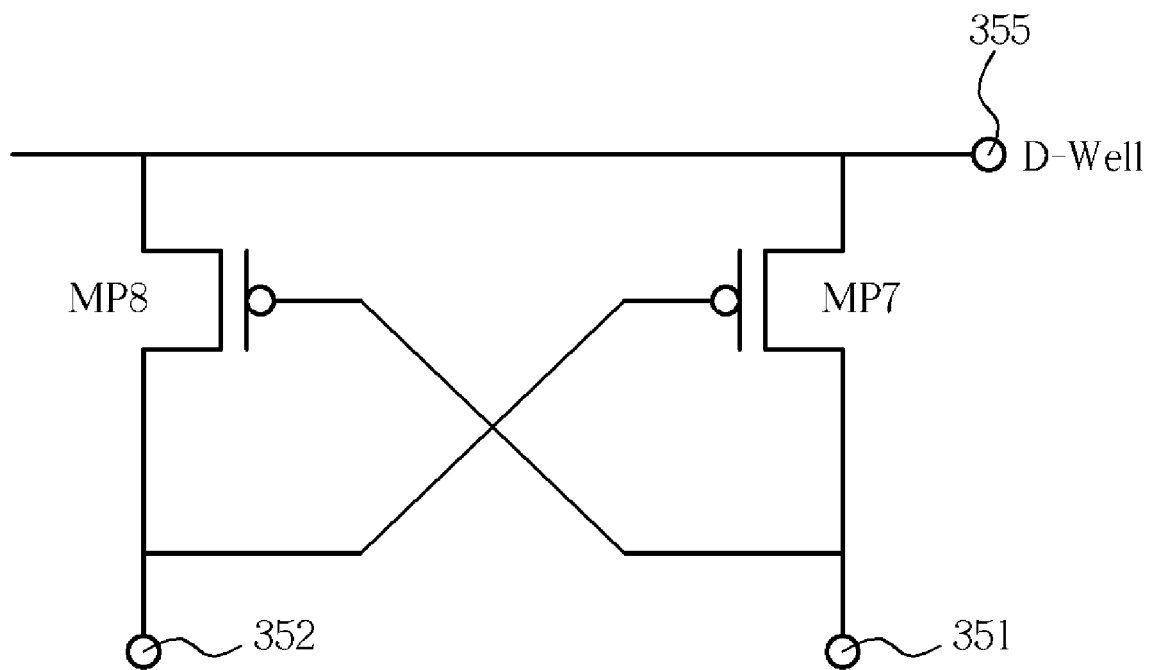
FIG. 4 is a schematic diagram of a switch unit according to an embodiment of the present invention.

Please refer to FIG. 4. FIG. 4 is a schematic diagram of the switch unit 350 according to an embodiment of the present invention. The switch unit 350 includes PMOS transistors MP7 and MP8, wherein a source electrode of the transistor MP7 is coupled to the reception end 310 of the charging device 30 through a first input end 351, a drain electrode of the transistor MP7 is coupled to an output end 355, and a gate electrode of the transistor MP7 is coupled to the rechargeable battery 320 through a second input end 352; a source electrode of the transistor MP8 is coupled to the rechargeable battery 320 through the second input end 352, a drain electrode of the transistor MP8 is coupled to the output end 355 and a gate electrode of the transistor MP8 is coupled to the reception end 310 of the charging device 30 through the first input end 351. Therefore, when the charging voltage Vs is connected to the charging device 30, that is, when performing the charging procedures, the voltage received by the first input end 351 is greater than that received by the second input end 352, so that the voltage D-Well outputted by the output end 355 is immediately switched to the charging voltage Vs. Conversely, when the connection between the reception end 310 and the charging voltage Vs is removed, that is, at the instant when the external power source is removed after completing recharging, the charging voltage Vs disappears, and thus the voltage of the second input end 352 is higher than that of the first input end 351, so that the voltage D-Well outputted by the output end 355 can be immediately switched to the voltage of the rechargeable battery 320.

Please come back to FIG. 3. In FIG. 3, the current generation unit 340 is a current mirror circuit, and includes PMOS transistors MP2 and MP3, wherein a source electrode of the transistor MP2 is coupled to the reception end 310, a drain electrode of the transistor MP2 is coupled to a reference current source Iref, and a gate electrode of the transistor MP2 is coupled to the reference current source Iref and the bias end of the current generation unit 340 (node A); a source electrode of the transistor MP3 is coupled to the reception end 310, and a drain electrode of the transistor MP3 is coupled to the rechargeable battery 320, and a gate electrode of the transistor MP3 is coupled to the bias end of the current generation unit 340 (node B). Thus, as well known by those skilled in the art, the current generation unit 340 can "mirror" and amplify the current of the reference current source Iref for the transistor MP3 capable of generating a corresponding charging current I1 to the rechargeable battery 320 according to the charging voltage Vs received by the reception end 310 and the connection condition between the bias ends (node A and B) of the current generation unit 340. Preferably, a base electrode of the transistor MP3 can be coupled to the output end 355 of the switch unit 350 for providing a reverse bias according to the voltage D-Well outputted by the switch unit 350.

Please further refer to FIG. 3. The control unit 360 includes PMOS transistors MP4, MP5 and MP6 and an NMOS transistor MN1, wherein source electrodes of the transistors MP5 and MP6 are coupled to the switch unit 350 through the third end 363 of the control unit 360, gate electrodes of the transistors MP5 and MP6 are coupled to the control signal DET, and drain electrodes of the transistors MP5 and MP6 are respectively coupled to the second end 362 of the control unit 360 and a node C; a source electrode of the transistor MN1 is coupled to a ground end, a drain electrode of the transistor MN1 is coupled to the node C, and a gate electrode of the transistor MN1 is coupled to the control signal DET; a source electrode of the transistor MP4 is coupled to the first end 361 of the control unit 360, a drain electrode of the transistor MP4 is coupled to the second end 362 of the control unit 360, and a gate electrode of the transistor MP4 is coupled to the node C. Thus, when the charging voltage Vs is connected to the reception end 310, i.e. when the charging device 30 is connected to the external power source, since the system is not stable yet, the control signal DET is still in a low logic level state, although the voltage D-Well outputted by the switch unit 350 is already switched to the charging voltage Vs. In this case, the transistors MP5 and MP6 are turned on, and thus the voltage of the gate electrode of the transistor MP3 (i.e. node B) becomes the charging voltage Vs, so that the transistor MP3 is still in a turn-off state for preventing from the occurrence of the inrush current. By the time that the system is stable, the control signal output unit can determine whether to perform the charging procedures; if so, the control signal DET is converted from the low logic level to the high logic level. In this case, the transistors MP5 and MP6 are turned off, and the transistor MN1 is turned on, so that the transistor MP4 is turned on as well. Thus, the gate electrode of the transistor MP3 (i.e. node B) can receive the bias voltage from the node A for turning on the transistor MP3 to generate the corresponding charging current I1 to the rechargeable battery 320. On the other hand, when completing charging the rechargeable battery 320, i.e. when the connection between the reception end 310 of the charging device 30 and the charging voltage Vs is removed, the voltage D-Well outputted by the switch unit 350 can be immediately switched to the voltage of the rechargeable battery 320, and the control signal DET is also immediately converted from the high logic level to the low logic level. In this case, the transistors MP5 and MP6 are turned on, and the transistor MN1 is turned off, so that the voltages of the gate electrodes of the transistors MP3 and MP4 are both fixed in the voltage of the rechargeable battery 320. Therefore, both of the transistors MP3 and MP4 cannot be turned on, and thus there does not exist corresponding current paths for the currents to flow back, so that the backflow current protection can be achieved.

Therefore, by the dynamic protection unit 330, the present invention can conduct the current path of the charging current until the system is stable for preventing from the occurrence of the inrush current when the charging device 30 is connected to the external power source; on the other hand, the present invention can immediately cut off the corresponding current path for preventing the currents from flowing back to achieve the backflow current protection when the external power source is removed after completing recharging the battery.

As mentioned above, by the dynamic protection unit, the charging device of the present invention can solve the problems of the backflow current and the inrush current at the same time. Moreover, compared with the prior art, the charging device of the present invention can be realized as a simple circuit with few transistors, and thus the layout area of the circuits can be saved, so as to reduce the production cost.

Those skilled in the art will readily observe that numerous modifications and alterations of the device and method may be made while retaining the teachings of the invention.

What is claimed is:

1. A charging device capable of providing backflow current and inrush current protection comprising:
   a reception end for receiving a charging voltage;
   a rechargeable battery; and
   a dynamic protection unit, coupled between the reception end and the rechargeable battery, for controlling connection between the reception end and the rechargeable battery according to a control signal and a connection condition between the reception end and the charging voltage;
   wherein the dynamic protection unit cuts off a current path between the reception end and the rechargeable battery according to a first voltage level of the control signal and a voltage of the rechargeable battery when the connection between the reception end and the charging voltage is removed, and conducts the current path between the reception end and the rechargeable battery according to a second voltage level of the control signal and the charging voltage when the charging voltage is connected to the reception end;
   wherein the dynamic protection unit comprises:
   a current generation unit, coupled between the reception end and the rechargeable battery, for generating a charging current and a corresponding current path;
   a switch unit for outputting a greater voltage from the voltage of the rechargeable battery and the charging voltage to the current generation circuit so as to prevent current leakage on the corresponding current path and accordingly achieve the inrush current protection; and
   a control unit, comprising a first end and a second end coupled to bias ends of the current generation unit and a third end coupled to the switch unit, for controlling connection between the bias ends of the current generation unit according to the voltage level of the control signal and a voltage outputted by the switch unit.

2. The charging device of claim 1, wherein the current generation unit is a current mirror circuit.

3. The charging device of claim 2, wherein the current generation unit comprises:
   a first PMOS transistor comprising a source electrode coupled to the reception end, a drain electrode coupled to a reference current source, and a gate electrode coupled to the reference current source and the first end of the control unit; and
   a second PMOS transistor comprising a source electrode coupled to the reception end, a drain electrode coupled to the rechargeable battery, and a gate electrode coupled to the second end of the control unit.

4. The charging device of claim 3, wherein the second PMOS transistor further comprises a base electrode, coupled to the switch unit, for providing a reverse bias according to the voltage outputted by the switch unit.

5. The charging device of claim 1, wherein the switch unit comprises:
   a first input end, coupled to the reception end, for receiving the charging voltage;
   a second input end, coupled to the rechargeable battery, for receiving the voltage of the rechargeable battery;
   an output end;

a first PMOS transistor comprising a source electrode coupled to the first input end, a drain electrode coupled to the output end, and a gate electrode coupled to the second input end; and a second PMOS transistor comprising a source electrode coupled to the second input end, a drain electrode coupled to the output end, and a gate electrode coupled to the first input end.

6. The charging device of claim 1, wherein the control unit comprises:

a first PMOS transistor comprising a source electrode coupled to the third end of the control unit, a drain electrode coupled to the second end of the control unit, and a gate electrode, coupled to the control signal, for controlling electrical connection between the source electrode and the drain electrode of the first PMOS transistor according to the voltage level of the control signal and a voltage of the third end;

a second PMOS transistor comprising a source electrode coupled to the third end of the control unit, a drain electrode coupled to a node, and a gate electrode, coupled to the control signal, for controlling electrical connection between the source electrode and the drain electrode of the second PMOS transistor according to the voltage level of the control signal and the voltage of the third end;

a first NMOS transistor comprising a source electrode coupled to a ground terminal, a drain electrode coupled to the node, and a gate electrode, coupled to the control signal, for controlling electrical connection between the source electrode and the drain electrode of the first NMOS transistor according to the voltage level of the control signal; and a third PMOS transistor comprising a source electrode coupled to the first end of the control unit, a drain electrode coupled to the second end of the control unit, and a gate electrode coupled to the node, for controlling electrical connection between the source electrode and the drain electrode of the third PMOS transistor according to voltages of the node and the second end of the control unit.

7. The charging device of claim 1, wherein the control signal is generated by a control signal output unit, the control signal output unit outputs a first voltage level of the control signal when the charging voltage is removed, and outputs a second voltage level of the control signal after a predetermined time when the charging voltage is connected.

8. The charging device of claim 7, wherein the control signal output unit is implemented in firmware.

9. The charging device of claim 1, wherein the first voltage level of the control signal is a low logic voltage level.

10. The charging device of claim 1, wherein the second voltage level of the control signal is a high logic voltage level.

11. The charging device of claim 1, wherein the charging voltage is provided by an external power supply.

12. The charging device of claim 11, wherein the charging voltage is provided by a universal serial bus (USB).

* * * * *